Jan. 8, 1924. 1,479,952
A. C. BOYCE
LATHE CENTER
Filed May 22, 1922

Inventor
A. C. Boyce,
By Watson E. Coleman
Attorney

Patented Jan. 8, 1924.

1,479,952

UNITED STATES PATENT OFFICE.

ALBERT C. BOYCE, OF MUSKOGEE, OKLAHOMA.

LATHE CENTER.

Application filed May 22, 1922. Serial No. 562,711.

*To all whom it may concern:*

Be it known that I, ALBERT C. BOYCE, a citizen of the United States, residing at Muskogee, in the county of Muskogee and State of Oklahoma, have invented certain new and useful Improvements in Lathe Centers, of which the following is a specification, reference being had to the accompanying drawings.

The purpose of the present invention is to provide a lathe center, more commonly known as the dead center, wherein the center is in the tail stock, and another purpose is to provide renewable and removable parts and attachments for the lathe center, especially where wear occurs.

Still another purpose is to provide a lathe center which turns with the work thereby eliminating the wear on the center due from friction.

A further purpose is to provide a lathe center which will result in more accurate work, and also furnish a lathe center which has practically no wearing parts.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1:
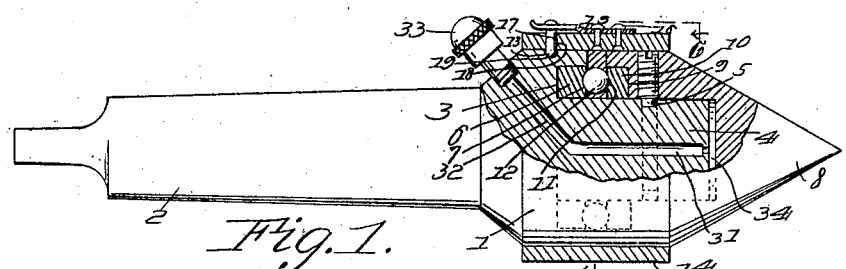
Figure 1 is a view in elevation of a lathe center, showing parts broken away to disclose the interior construction, and which illustrates one form of center.

Referring to the drawings, 1 designates the body of the lathe center holder, which is provided with a shank 2, adapted to fit in the tail stock of a lathe, and is designed to be stationary. The body 1 of the center holder has a chambered out face, thereby providing a cavity 3, from the bottom of which an extension shaft or stud 4 extends. This extension shaft or stud 4 is provided with an annular groove 5, to be engaged by a set screw or similar device, for the purpose of holding the lathe center proper to the shaft or stud.

A suitable ball cone 6 is mounted in the cavity 3 in surrounding relation to the extension shaft or stud 4, and is provided with a suitable raceway 7.

Referring to Figure 1 it will be noted that one form of lathe center proper, designated by the character 8 is fitted telescopically upon the extension shaft or stud 4. A face of this lathe center 8 is counterbored to provide a cavity 9 for the reception of a ball cone 10. The ball cone 10 on one face is provided with a raceway 11. The adjacent raceways 7 and 11 of the ball cones 6 and 10 receive the anti-frictional ball bearings 12, which take care of the thrust wear, which is practically all the wear to which this lathe center is subjected. The thrust ball bearings 12 are carried by a cage 13, which is interposed between the adjacent faces of the body 1 and the lathe center proper 8. This cage acts to hold the thrust ball bearings in position, so that the ball cones 6 and 10 may operate concentrically with the shaft or stud 4 which projects from the body 1.

A dust excluding sleeve or band 14 surrounds the body 1 on the cylindrical portion of the lathe center proper 8, and acts to exclude the dust and other foreign matter. This sleeve or band carries a leaf spring 15 secured by means of suitable rivets, pins or the like 16. The yieldable end of the spring 15 carries a lateral lug or pin 17, which projects through an opening 18 of the band or sleeve 14, and which engages within a suitable depression or socket 19 for holding the band or sleeve securely to the body 1 and over the cylindrical portion thereof.

Figure 2:
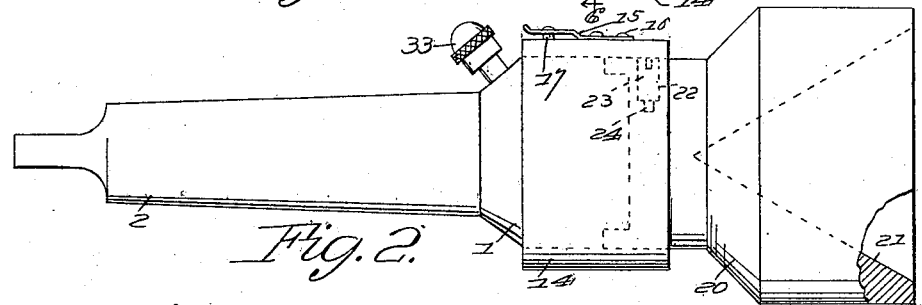
Figure 2 is a view in side elevation of a tool showing another form of center.

As shown in Figure 2, what is known as a lathe bell center 20 is mounted upon the extension shaft or stud 4. This lathe center is provided with a conical cavity 21 which receives the work for centering the same. As disclosed in Figure 3 a cone center is applied within the bell center, and in Figure 4 the cone center is shown applied externally upon the lathe center.

Figure 5:
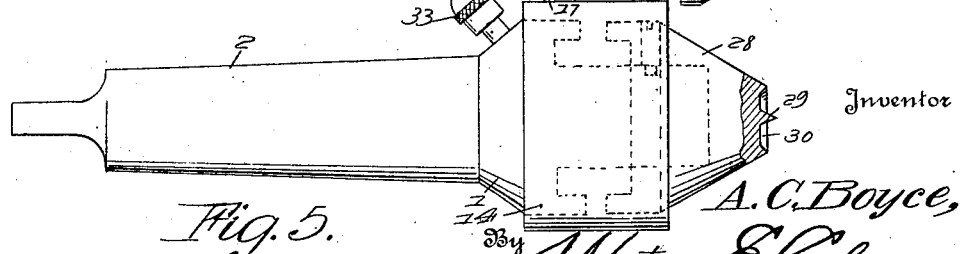
Figure 5 is a view in elevation, showing a spur tail stock center adapted particularly for wood lathes.

In Figure 5 a suitable spur center is applied to the center holder, this type being particularly adapted for use in connection with wood lathes.

These various centers shown in Figures 2 and 5 are provided with threaded openings or holes 22, for the reception of set screws 23 for holding the various centers on the tool. The inner end of the screw has an extension 24, which enters the annular groove 5 of the extension shaft or stud 4, for the purpose of holding the center to the extension shaft so that the lathe center is capable of rotating, but not capable of detaching from the shaft or stud.

Figures 3, 6:
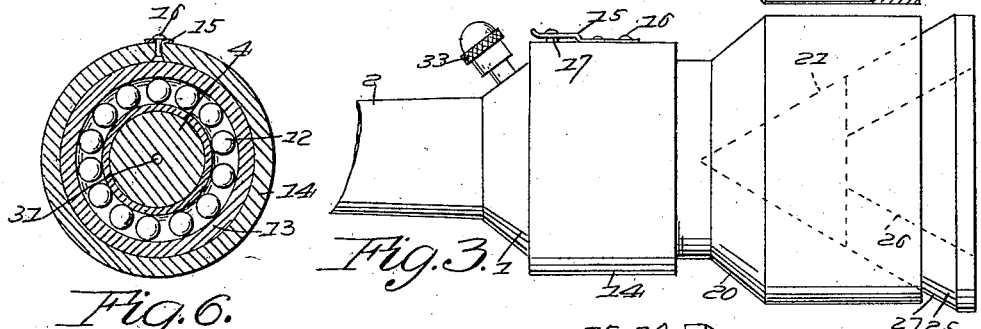
Figure 3 is a view similar to Figure 2 showing a cone center, within the center shown in Figure 2.
Figure 6 is a sectional view on line 6—6 of Figure 1.
Figure 4:
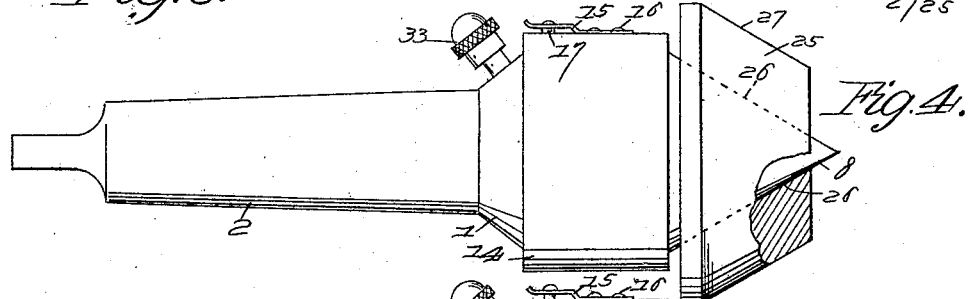
Figure 4 is a view similar to Figure 2 showing the cone center fitted upon the conical end of the lathe center 8 which is shown in Figure 1.

It is obvious that the center 25 in Figure 3 may fit over the conical portion of the center 8, the center 25 being provided with a corresponding conical opening 26 for this purpose. Obviously the center 25 may be inverted and placed in cooperation with the center 20, enabling the outer conical surface 27 thereof to engage the conical wall of the chambered out portion 21 of the center 20. The spur center 28 shown in Figure 5 has a spur 29 projecting from the cavity 30 of the end of the spur center, and this spur center is particularly adapted for use in connection with wood lathes. In fact, if desired, the center 25 in Figure 3 may be applied to fit and receive the spur center 28 (which is correspondingly tapered), so as to enter the conical or tapered opening or bore 26.

The dust excluding sleeve or band is designed to fit snugly on the body of the tool, which has a centrally located passage 31, one end of which terminates in an angularly disposed passage 32, in which a suitable oil or lubricating cup 33 is secured for the purpose of lubricating the cavity 34 of either one of the centers, by reason of the fact that the passage 31 opens at the end of the extension shaft or stud 4 through the medium of an orifice.

The invention having been set forth, what is claimed is:—

1. A lathe center comprising a body having a reduced shank adapted for engagement within the tail stock of a lathe, the face of the body opposite the shank being formed with a chamber, and an extension shaft at the center of the chamber projecting beyond said face, a thrust bearing located within said chamber, a center proper having a body portion fitting upon said extension shaft in engagement with the thrust bearing, and a retaining member movably mounted in the center proper and operatively engaging the extension shaft whereby to permit rotation of the center member upon the extension shaft while preventing longitudinal displacement.

2. A lathe center comprising a body formed with a shank adapted for engagement within the tail stock of a lathe, the face of the body opposite the shank being formed with a chamber, and an extension shaft at the center of the chamber projecting beyond said face of the body, a thrust bearing within the chamber, a center proper rotatably and non-slidably engaged upon said extension shaft, a dust excluding band surrounding the body and covering the thrust bearing structure, and a spring latch carried by the band and engaging the body whereby to maintain the band in operative position.

3. In a device of the character described, a body having a shank for engagement within a lathe tail stock, a center proper rotatably and non-slidably connected with the body, a thrust bearing between the body and the center proper, a dust excluding band removably mounted upon the body for covering said thrust bearing structure, an elongated leaf spring mounted on the band and carrying a pin fitting within a hole in the band, the body being formed with a socket receiving the free end of said pin.

In testimony whereof I hereunto affix my signature.

ALBERT C. BOYCE.